June 4, 1963

E. H. KROHN 3,092,783

POWER AMPLIFIER

Filed July 30, 1958

4 Sheets-Sheet 1

INVENTOR.
EARL H. KROHN
BY Joseph Weingarten
ATTORNEY

June 4, 1963 E. H. KROHN 3,092,783

POWER AMPLIFIER

Filed July 30, 1958 4 Sheets-Sheet 2

*INVENTOR.*

EARL H. KROHN

BY

Joseph Weingarten

ATTORNEY

June 4, 1963 E. H. KROHN 3,092,783

POWER AMPLIFIER

Filed July 30, 1958 4 Sheets-Sheet 3

INVENTOR.

EARL H. KROHN

BY Joseph Weingarten

ATTORNEY

June 4, 1963 E. H. KROHN 3,092,783

POWER AMPLIFIER

Filed July 30, 1958 4 Sheets-Sheet 4

INVENTOR.
EARL H. KROHN
BY Joseph Weingarten
ATTORNEY 3,092,783
Patented June 4, 1963

3,092,783

POWER AMPLIFIER

Earl H. Krohn, Brookline, Mass., assignor to Krohn-Hite Laboratories, Inc., Cambridge, Mass., a corporation of Massachusetts Filed July 30, 1958, Ser. No. 751,971
17 Claims. (Cl. 330—98)

The present invention relates in general to power amplifiers and more particularly concerns a novel transformless amplifier for reproducing a low level input signal at high power level with very low distortion over a wide frequency range. Although the amplifier response extends uniformly from D.-C. through a range including radio frequencies, drift is negligible and the output impedance exceptionally small.

Transformerless power amplifiers are well known in the art. Typically these amplifiers comprise a pair of output electron tubes connected in series across a D.-C. potential source and driven in push-pull by oppositely-phased driving signals. However, a number of problems are presented when it is desired to achieve very low distortion over a wide frequency range including D.-C.

It will be recalled that push-pull operation is advantageous for cancelling distortion due to the non-linear characteristics of electron tubes. Maximum cancellation is obtained when a pair of tubes having like characteristics are operated over the same range. In conventional push-pull output circuits having output transformers, this is readily accomplished by arranging like parameters in the circuit symmetrically. In a circuit having power output tubes in series, symmetry is not easily obtained. The problem is better understood when it is recognized that the lower tube may function as a cathode resistance for the upper tube. Hence, the signal which effectively drives the upper tube is a function of the potential on its cathode and the driving signal applied to the upper tube control grid while the lower tube is driven only by the driving signal applied to its control grid. As a result, it is difficult to operate the two tubes over exactly the same portion of the tube transfer characteristic. Consequently, cancellation of nonlinear effects is incomplete even with balanced tubes and some distortion appears in the output signal, despite considerable amounts of negative feedback.

It is evident that faithfully reproducing an input signal waveform is a problem with an A.-C. amplifier of this type. However, the difficulty is increased for an amplifier having a response beginning at D.-C. Generally, there is a biasing point for a particular tube type which results in minimum distortion. Since the tube characteristics of a particular type are not uniformly maintained in production, the quiescent current through the series tubes under static conditions will depend on the specific characteristics of the particular tubes then in the circuit. Generally, this current is adjusted to minimize distortion while retaining high operating efficiency. In accordance with conventional amplifier techniques, this adjustment would be accomplished by varying the static bias on one or both tubes. For minimum distortion, the bias on both tubes should be changed by the same increment. If adjusted separately, it is difficult to obtain the desired setting exactly since both output level and the quiescent current must be observed while making two bias adjustments. If the bias of only one tube is adjusted, an unbalance is created with a resultant increase in distortion and the voltage level on the output terminal shifts.

If additionally it is desired that the amplifier have a uniform frequency response well into the radio frequency region, additional problems are presented in providing an input amplification stage having sufficient gain to provide the required drive over a wide bandwidth without instability. This is an especially serious problem when a large amount of negative feedback is used to almost completely eliminate distortion.

Accordingly, the present invention contemplates and has as a primary object the provision of a wideband D.-C. amplifier with very low distortion.

It is another object of the invention to achieve the preceding object without using an output transformer.

Still another object of the invention is to provide means for adjusting the quiescent current in the final stage of a power amplifier with but a single control without unbalancing the tube operating points.

A further object of the invention is to provide means for driving the upper tube of a series-connected pair of electron tubes independently of variations in the plate potential of the lower tube.

It is still another object of the invention to provide a wide band input stage for a feedback power amplifier having a relatively high gain-bandwith product without disturbing the stability of the amplifier.

According to the invention, the power amplifier includes an input stage having a cathode circuit including the shunt combination of an inductor, cathode capacitor and cathode resistor. The inductor and cathode resistor cause the frequency response of the stage to decrease with increasing frequency in the middle range of frequencies amplified by the amplifier while the cathode resistor and cathode capacitor compensate for the fall off in response caused by resistance and capacity connected across the output of the stage.

The output stage of the amplifier comprises upper and lower tubes connected in series across a potential source and driven by oppositely phased signals direct coupled from the driving stage. Means are provided for coupling variations in potential at the junction of the series-connected tubes to the driving stage in a manner whereby the upper tube is driven only by its respective driving signal from the driving stage. The driving stage is so arranged that an adjustment of a variable resistance therein varies the current through the series-connected tubes without unbalancing tube operating points.

Other features, objects and advantages of the invention will become apparent from the following specification when read in connection with the accompanying drawing in which.

In the different figures of the drawing, like elements are designated by the same reference symbol.

Figure 1:
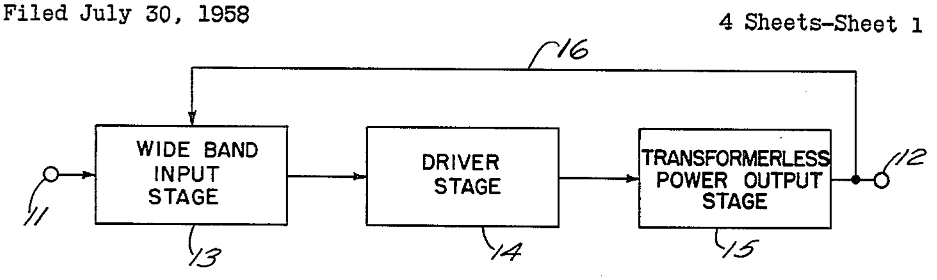
FIG. 1 is a block diagram generally illustrating the logical arrangement of the amplifier.

With reference to the drawing, and more particularly FIG. 1 thereof, there is illustrated the logical arrangement of the amplifier. A low level input signal applied on terminal 11 is faithfully reproduced at high power level on output terminal 12. The input signal on terminal 11 is applied to a wide-band input stage 13 which provides oppositely phased signals to driver stage 14. Driver stage 14 responds to the latter signals by energizing the transformerless power output stage 15 with oppositely phased driving signals. Output stage 15 delivers the amplified input signal to output terminal 12 either directly, when operated as a D.-C. amplifier, or through a capacitor when D.-C. amplification is not required. A portion of the output signal on terminal 12 is inversely fed back over feedback line 16 to the feedback input of the wide-band input stage 13.

Figures 2, 3, 4, 5:
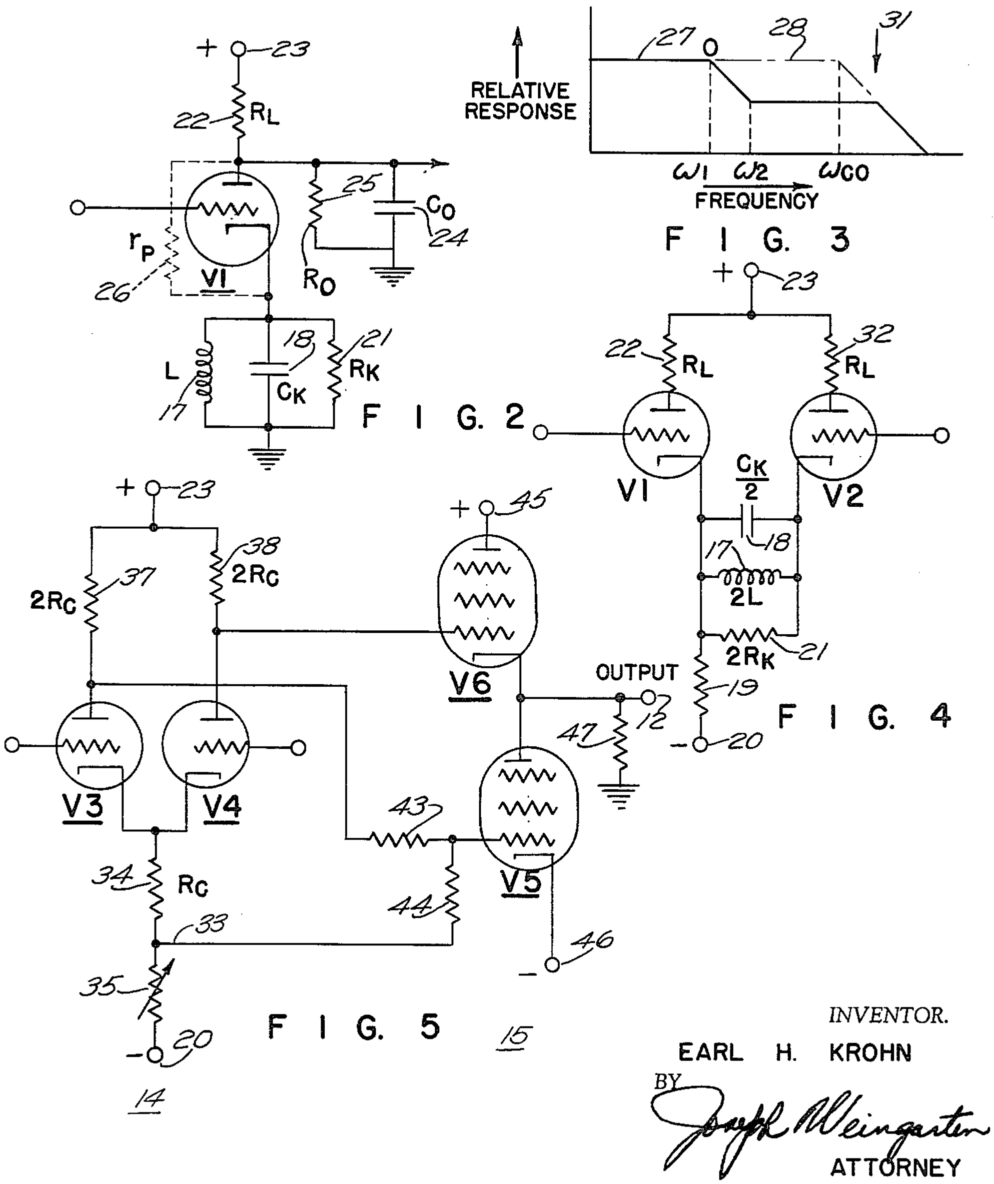
FIG. 2 is a schematic circuit diagram of one form of the novel input stage.
FIG. 3 illustrates the frequency response characteristic of the circuit of FIG. 1 when arranged according to the invention.
FIG. 4 is a schematic circuit diagram of a differential amplifier type input stage arranged according to the invention.
FIG. 5 is a schematic circuit diagram of a circuit permitting adjustment of the power amplifier quiescent current without unbalancing tube operating points.

Having discussed the logic arrangement of the amplifier, it is appropriate to consider the various stages therein in greater detail. With reference to FIG. 2, there is shown a schematic circuit diagram of one embodiment of input stage 13. The circuit comprises an electron tube V1 and associated circuit components. The shunt combination of an inductor 17, a cathode capacitor 18 and cathode resistor 21 is connected between the cathode of tube V1 and ground. The input signal is coupled to the control grid of tube V1. A load resistor 22 is connected between the plate of tube V1 and positive terminal 23. The output capacity and resistive loading of the following stage is represented by capacitor 24 and resistor 25, respectively. The plate resitsance 26 between plate and cathode of tube V1 is represented by dotted lines.

Referring to FIG. 3, there is shown a graphical representation of the desired frequency response characterisic of the input stage 13 shown in FIG. 2. The solid curve 27 represents this characteristic while the dash-dot curve 28 shows the response curve of a conventional capacitively-loaded input stage hving a break point at a frequency $\omega_{c0}$. The slope of the portioin 31 is determined by the time constant $R_0C_0$.

The response represented by the solid curve 27 uses the available gain-bandwidth product more advantageously by maximizing the gain in the low range of frequencies while reducing the response slightly in the higher range of frequencies where excessive gain might result in oscillation. Yet, the deviation from uniformity in response may be made relatively small over a wide band of frequencies. This response is substantially uniform to the first break point at a frequency $\omega_1$ and then decreases to a frequency $\varpi_2$. The response then remains substantially flat above $\omega_2$ until the sloping portion 31 is reached. At this point curve 27 follows sloping portion 31.

This type of response is achieved conventionally by placing the serial combination of a resistor and capacitor across the plate load resistor. At high frequencies, the capacitor becomes a short circuit and the effective load impedance is appreciably reduced. This is disadvantageous because the plate voltage swing for a given change in plate current is reduced. Consequently, a relatively high voltage swing can be obtained only by a correspondingly high plate current swing, thereby increasing the non-linear distortion. The circuit of FIG. 2 overcomes this disadvantage because the frequency sensitive circuit is in series with the amplifier cathode rather than across its plate load resistance.

If the various elements shown in FIG. 2 assume values designated by the symbols tabulated below, relations may be established for producing the desired response represented by curve 27. The symbols are:

$C_0$—total output capacity
$R_0$—following stage load
$R_L$—plate load resistor
$r_p$—tube plate resistance
$\mu$—tube amplification factor
$R_{PAR}$—parallel resistive combination of $R_L$, $R_0$ and $r_p$
$C_K$—cathode capacitor
$R_K$—cathode resistor Without compensation $$\omega_{c0}=\frac{1}{R_{PAR}C_0}$$

Then, L, $C_K$ and $R_K$ are chosen to satisfy the following relations:

$$(\mu+1)\omega_1 L=R_L+r_p \quad (1)$$
$$R_K=\omega_2 L \quad (2)$$

and $$R_K C_K=R_{PAR}C_0 \quad (3)$$

With reference to FIG. 4, there is shown a preferred arrangement of the input stage incorporating the principles discussed above in connection with the circuit of FIG. 1. The circuit of FIG. 4 offers additional advantages because a separate isolated feedback input is available and a pair of oppositely phased signals of equal amplitude are provided while still retaining the desired frequency response characteristics. Moreover, the differential arrangement is especially advantageous in a D.-C. amplifier because it provides drift cancellation.

This circuit incorporates an additional electron tube V2 arranged in a differential amplifier with tube V1. The input signal is applied to the control grid of tube V1. The feedback signal may be applied to the control grid of tube V2. Load resistors 22 and 32, each of value $R_L$, are connected from positive terminal 23 to the plates of tubes V1 and V2, respectively. The parallel combination of inductor 17, cathode capacitor 18 and cathode resistor 21 is connected between the cathodes of tubes V1 and V2. If each of the elements forming this parallel combination has twice the impedance it had in the circuit of FIG. 1, the relations set forth above apply to the determination of the frequency response of this differential amplifier circuit. Hence, in the circuit configuration of FIG. 4 these elements are designated as having respective values 2L, $C_K/2$ and $2R_K$. A resistor 19, much larger than resistor 21, is connected from the cathode of tube VI to negative terminal 20.

Referring to FIG. 5, there is shown a schematic circuit diagram which illustrates the relationship between driver stage 14 and output stage 15 whereby the current through the series-connected tubes in the latter stage may be adjusted with a single control to change the bias on both tubes by the same increment. The driver stage 14 comprises electron tubes V3 and V4 and associated circuitry. The cathodes of tubes V3 and V4 are connected together to cathode resistor 34 having a value $R_C$. A variable resistance 35 is connected in series between a junction 33 with cathode resistor 34 and negative terminal 20. Load resistors 37 and 38 are connected from positive terminal 23 to the plates of tubes V3 and V4, respectively, each being equal to $2R_C$, twice the value of cathode resistor 34. Oppositely-phased signals from the plates of tubes VI and V2 (FIG. 4) are coupled to the grids of tubes V3 and V4, respectively.

The output stage includes tubes V5 and V6 connected in series. The plate of tube V3 is direct coupled to the grid of lower tube V5 by resistor 43. The plate of tube V4 is direct coupled to the grid of upper tube V6. Resistor 44 is connected from the grid of lower tube V5 to the junction 33 of resistors 34 and 35. The plate of upper tube V6 is energized from a source of positive potential on terminal 45. The cathode of lower tube V6 is connected to negative terminal 46. The junction of the plate of lower tube V5 and the cathode of upper tube V6 is direct coupled to output terminal 12. A resistance 47 is connected from terminal 12 to ground. Since preferably tubes V5 and V6 are either pentodes or beam power tubes, the screen and suppressor grids are shown. However, the external connection of these electrodes is not related to the biasing feature and have been omitted from FIG. 5.

Having described the physical arrangement of the circuit, its mode of operation will be discussed. If the transconductance of an electron tube were linearly related to the grid potential from zero to cutoff, optimum efficiency with very low distortion would occur for class B push-pull operation. However, this relation is especially non-linear when the grid potential is near cutoff. Therefore, distortion is materially decreased without appreciably lessening efficiency by operating the tube class AB whereby a quiescent current of a very small value flows through the series-connected output tubes.

The quiescent current value is selected to minimize distortion without appreciably reducing efficiency. However, if one of the output tubes is changed or the characteristics of one changes appreciably, the quiescent current through the tubes deviates from the selected value. The circuit of FIG. 5 permits this adjustment to be made with but a single control by changing the bias on both tubes by the same increment without disturbing the balance of tube operating points.

This result will be better understood by initially assuming that the quiescent current is below the desired value. To increase the current, the potential on the grids of tubes V5 and V6 should be made less negative by the same increment. In order to see how this is accomplished, it is convenient to assume that the feedback loop is open as represented in FIG. 5.

The cathodes of tubes V3 and V4 follow the D.-C. potential on the grids so that the potential across resistors 34 and 35 is substantially constant. By increasing resistance 35, the current through resistance 34 decreases by an increment $\Delta i$, causing the potential on junction 33 to increase by an increment $\Delta i R_C$. This incremental decrease in current divides equally between tubes V3 and V4. Therefore, the potential on the plates of these tubes increases by an increment $$\frac{\Delta i 2R_c}{2}$$

or $\Delta i R_c$, the same rise which occurs on junction 33. Since the grid of tube V6 is direct-coupled to the plate of tube V3, it rises by this increment. The grid of tube V5 rises by the same amount because the ends of the attenuator formed by resistors 43 and 44 are connected to the plate of tube V4 and junction 33, respectively, points which rise by this amount. Thus, the single adjustment of resistance 35 controls the quiescent current in the output stage without unbalancing tube operating points.

Figure 6:
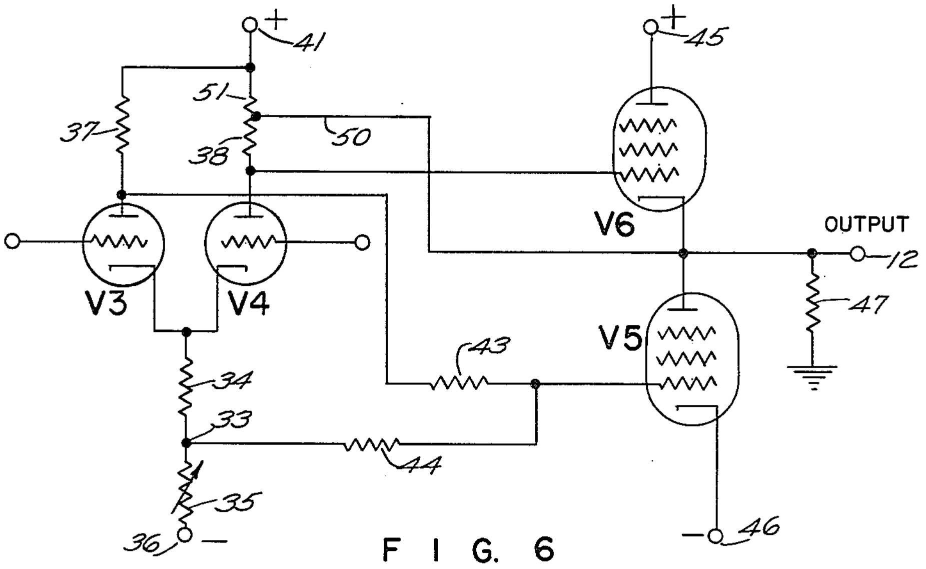
FIG. 6 is a schematic circuit diagram of a novel circuit for driving the upper tube of a series pair independently of potential variations on its cathode.

Referring to FIG. 6, there is shown a schematic circuit diagram of a circuit arrangement which permits the upper tube V6 to be driven with a signal effectively applied between cathode and grid, independently of variations of the plate current through lower tube V5.

The circuit of FIG. 5 is modified to include a resistor 51 in series with load resistor 38 in the plate circuit of tube V4. The junction 50 of the latter resistors is connected to the junction of the upper tube V6 cathode and lower tube V5 plate so that the signal developed across resistor 38 is effectively applied between cathode and grid of upper tube V5. While this arrangement works satisfactorily, lower tube V5 draws signal current through resistor 51, causing undesirable interaction between the final stage power supply and the supply delivering power to the earlier stages.

Figure 7:
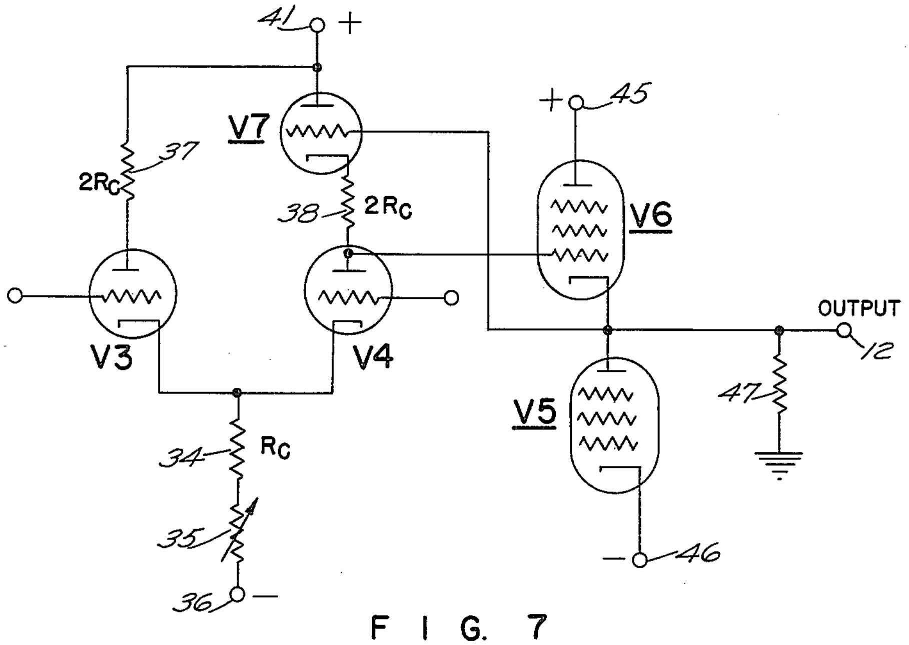
FIG. 7 is a schematic circuit diagram of a power amplifier in which a cathode follower couples the above-mentioned potential variations to the driving stage to effect the independent drive.

Referring to FIG. 7, there is shown a schematic circuit diagram of a circuit which achieves the advantages of the circuit of FIG. 6 without drawing additional current from the driver stage power supply. This is accomplished by replacing resistor 51 with an electron tube V7. The cathode of tube V7 is connected to plate resistor 38. Its plate is connected to positive terminal 41. The junction of the upper and lower tubes is connected to the grid of tube V7, causing the cathode potential of tube V7 to follow the latter junction potential. This results in upper tube V6 being driven independently of signal variations on its cathode with virtually no increase in the required D.-C. power. Ideally, the gain from the cathode of tube V6 to the high end of resistor 38 is unity if the plate resistance $r_p$ of tube V4 is infinite. For a non-infinite plate resistance of tube V4 and a load resistance of value $2R_C$, the gain is ideally $$\frac{r_p+2R_C}{r_p}$$

As a practical matter, it has been discovered that if tube V4 is a pentode and the gain of cathode follower V7 is nearly unity, satisfactory operation is obtained.

Figure 8:
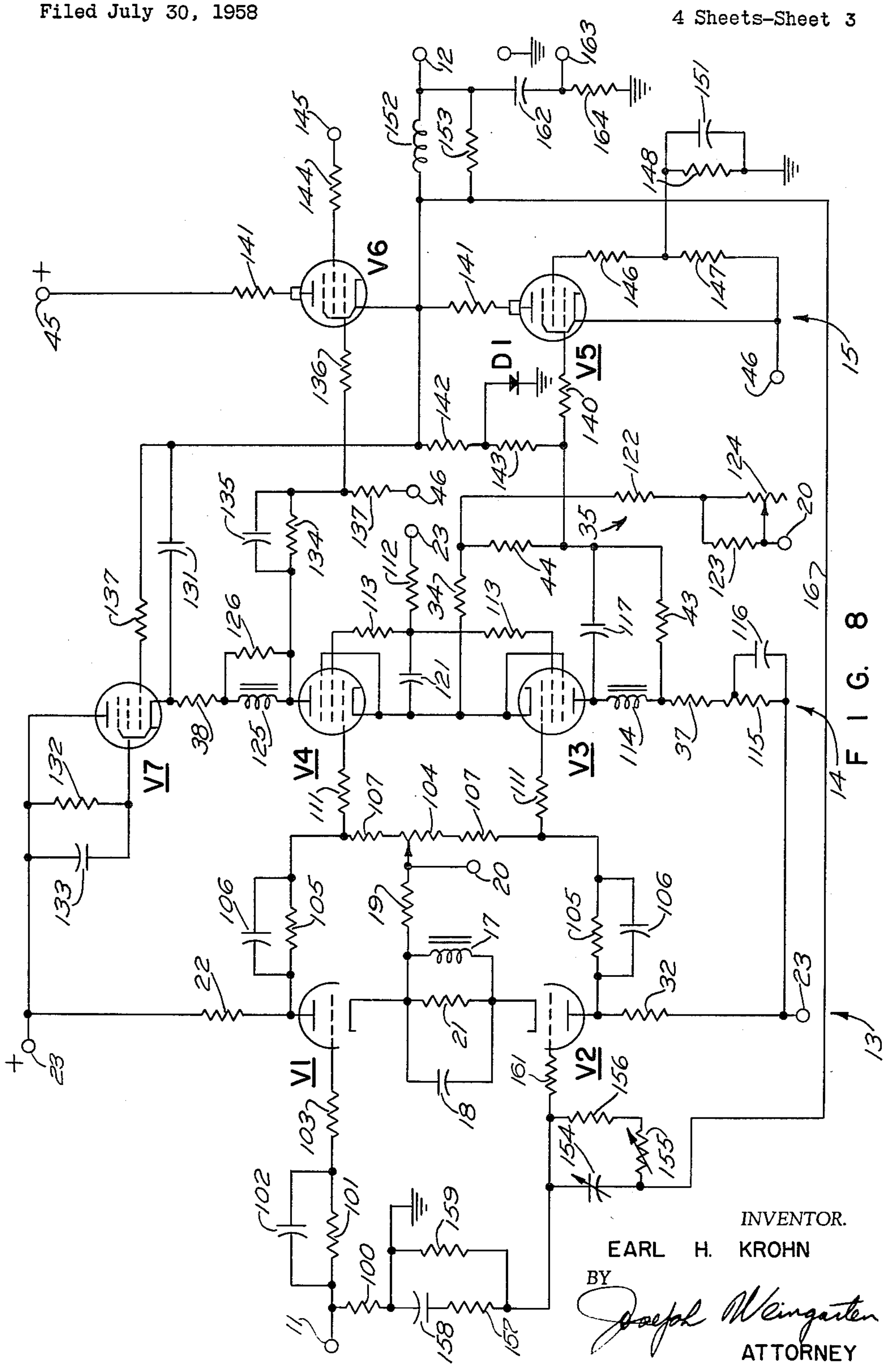
FIG. 8 is a schematec circuit diagram of a preferred embodiment of the invention.

Referring to FIG. 8, there is shown a schematic circuit diagram of a preferred embodiment of the invention. Since the principle of operation of much of the structure shown in FIG. 8 has been described above, the discussion of FIG. 8 will be limited to describing the relationship of additional components to those already described. Input terminal 11 is returned to ground by resistor 100 and coupled to the grid of tube V1 by a coupling network formed of resistor 101 shunted by capacitor 102 in series with a small parasitic suppression resistance 103.

The output of input stage 13 is direct-coupled to the input of driver stage 14 by a pair of symmetrical networks connected from the plates of tubes V1 and V2 to opposite ends of balancing potentiometer 104. Each of these networks includes a resistor 105 shunted by a capacitor 106 in series with a resistor 107. The junctions of resistors 105 and 107 are connected to respective ones of the control grids of tubes V3 and V4 by parasitic suppression resistors 111. Potentiometer 104 is adjusted to establish zero potential on output terminal 12 with the input shorted.

In the driver stage 14, the screen grids of tubes V3 and V4 receive energizing potentials from terminal 23 through screen resistor 112 and respective parasitic suppression resistors 113. A peaking inductor 114 is connected between the plate of tube V3 and load resistor 37. A voltage dropping resistor 115 is shunted by a bypass capacitor 116 and connected between load resistor 37 and terminal 23. A bypass capacitor 121 is connected between the cathodes of tubes V3 and V4 and resistor 112. Variable resistance 35 comprises a resistor 122 in series with resistor 123 shunted by potentiometer 124.

A peaking inductor 125 shunted by a resistor 126 is in series with the plate of tube V4 and load resistor 38. A parasitic suppression resistor 127 is in series with the grid of tube V7. The junction of tubes V5 and V6 is coupled to the cathode of tube V7 by capacitor 131. The screen grid of tube V7 receives a potential through screen dropping resistor 132, shunted by bypass capacitor 133, from positive terminal 23.

The plate of tube V4 is direct coupled to the grid of upper tube V6 by resistor 134 shunted by capacitor 135 in series with parasitic suppression resistor 136. A biasing resistor 137 is connected between terminal 46 and the junction of resistors 134 and 136 to control the static bias on tube V6.

Parasitic suppression resistors 141 are in series with the plates of tubes V5 and V6. A parasitic suppression resistor 140 is in series with the control grid of tube V5. Resistors 142 and 143 are connected in series between the junction of tubes V5 and V6 and resistor 140. Diode D1 is connected between the junction of resistors 142 and 143 and ground.

The network formed of resistors 142 and 143 and diode D1 connected as shown form a selectively activated local feedback path coupling the signal on output terminal 12 to the grid of tube V5. In order to appreciate the importance of this network, it is helpful to consider conditions which might develop in the absence of this network. Under conditions of no load being connected from terminal 12 to ground, high voltage swings may be developed on output terminal 12 with very little current swing being required. Accordingly, the feedback control system incorporated in the amplifier would cause a signal of very small amplitude to be applied to the grids of the upper and lower tubes. Since the tubes are operated class AB, the swing is frequently so small that the tubes are not alternately cut off. When tube V6 conducts continuously under these conditions, its maximum power dissipation rating may be exceeded, especially at ultra low frequencies.

The network prevents this from occurring in the following manner. When the plate-cathode junction of tubes V5 and V6 swings positive, diode D1 is rendered conductive to interrupt the local feedback path through resistors 142 and 143 and tube V6 conducts. When this junction swings negative, diode D1 is rendered nonconductive and the feedback path through these resistors is closed. A portion of the output signal is then inversely fed back to the grid of tube V5 causing degeneration. The feedback system responds to this locally introduced degeneration by causing an increase in the driving signal delivered by the driving stage to the grids of tubes V5 and V6. The increased drive to tube V6 at this time is sufficient to cut this tube off. This reduces the average plate current drawn by the tube and prevents its maximum dissipation ratings from being exceeded.

The screen grid of tube V6 is energized through parasitic suppression resistor 144 from positive terminal 145. The screen grid of tube V5 receives a potential through parasitic suppression resistor 146 from the junction of resistors 147 and 148 which form a voltage dividing network between ground and negative terminal 46. Resistor 148 is bypassed by capacitor 151. The junction of tubes V5 and V6 is direct coupled to output terminal 12 by inductor 152 shunted by resistor 153. The latter junction is coupled to the feedback input of input stage 13 by line 16. The network formed of inductor 152 and resistor 153 isolates high frequency signals which might be developed across the capacity of the output load from the plate-cathode junction of tubes V5 and V6. Without such isolation the phase lag introduced by the capacity of the load might cause instability.

A feedback network formed of variable capacitance 154 shunted by variable resistance 155 in series with resistance 156 is in series with resistor 157, serially-connected to capacitor 158. Resistor 159 shunts the serial combination of resistor 157 and capacitor 158. Capacitor 154 and resistor 155 may be adjusted to provide a desired amount of feedback while retaining the frequency insensitive properties of the attenuation network. The junction of resistors 156 and 157 is coupled to the control grid of tube V2 by parasitic suppression resistor 161.

By placing the small resistor 157 in series with capacitor 158, a phase lead is imparted into the feedback network which enables the amplifier response to extend well into the radio frequency region without developing instabilities. The same result may be accomplished by an inductor in series with capacitor 158. Such an inductor is preferably shunted by a resistor to damp the resonant circuit formed by the inductor with its stray capacity. For best operation, the impedance in series with capacitor 158 should be small compared to the capacitor impedance within the passband of the amplifier. This network, therefore, introduces a phase lead in the beta or feedback network for stabilization by increasing the feedback outside the amplifier pass band without disturbing the uniform response characteristics thereof within the pass band.

Output terminal 12 is coupled by capacitor 162 to A.-C. output terminal 163 when the amplifier is to be operated only as an A.-C. amplifier. A.-C terminal 163 is returned to ground by resistor 164.

Figure 9:
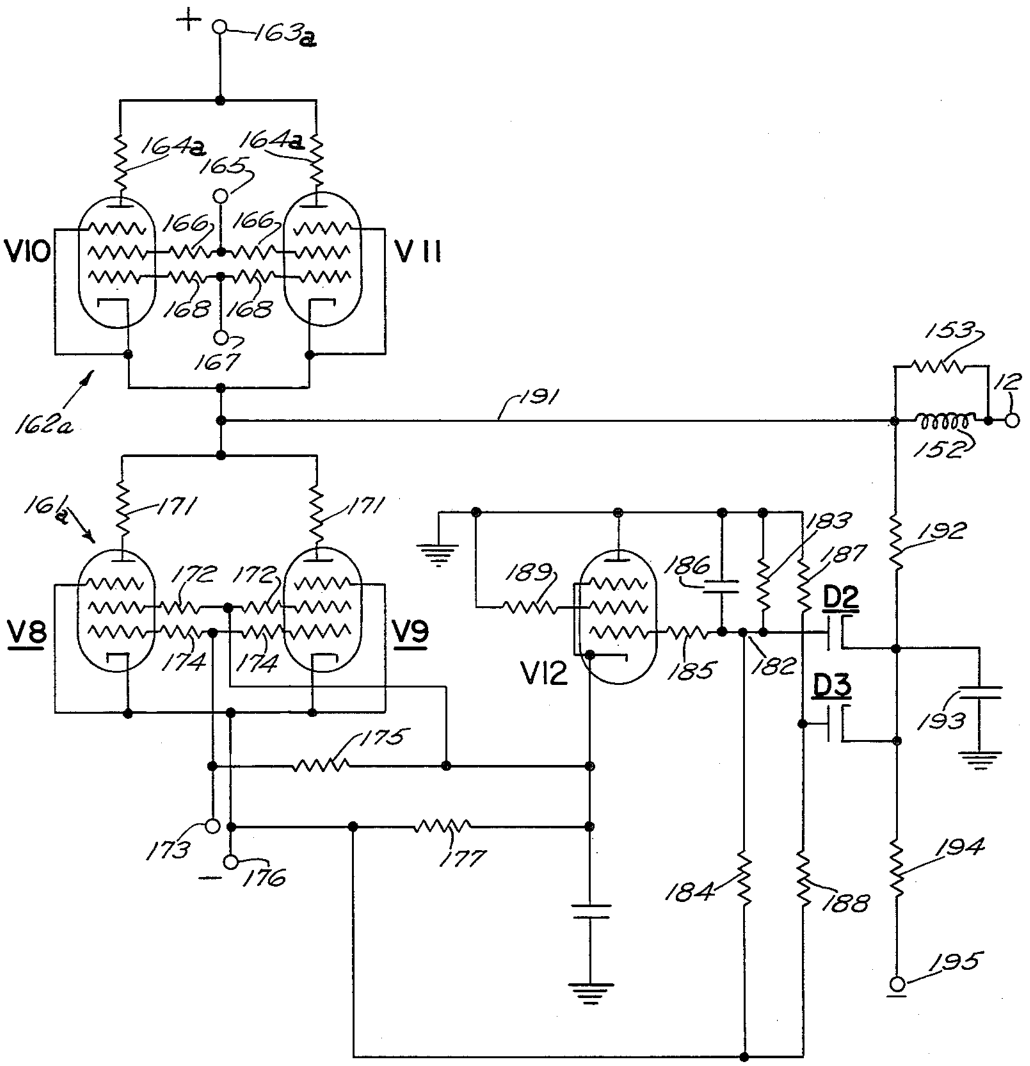
FIG. 9 is a schematic circuit diagram of an output stage arranged according to the invention for delivering power at very high levels.

Referring to FIG. 9, there is shown a schematic circuit diagram of a variation of the power output stage which materially increases the power output of the amplifier while still reproducing the input signal with great fidelity. Lower tube V5 is replaced by tubes V8 and V9 connected in parallel to form lower amplifier 161*a* while upper tube V6 is replaced by the parallel combination of tubes V10 and V11, forming upper amplifier 162*a*.

The plates of tubes V10 and V11 are coupled to a source of positive potential on terminal 163*a* by respective parasitic suppression resistors 164*a*. The screen grids of tubes V10 and V11 are coupled to a source of positive potential on terminal 165 by respective parasitic suppression resistors 166. The control grids of tubes V10 and V11 are coupled to terminal 167 by respective parasitic suppression resistors 168. Terminal 167 is directly connected to the plate of tube V4 (FIG. 8). The cathodes of tubes V10 and V11 are connected together and coupled to output terminal 12 by inductor 152 shunted by resistor 153.

The plates of tubes V8 and V9 are coupled to the cathodes of tubes V10 and V11 by respective parasitic suppression resistors 171. The screen grids of tubes V8 and V9 are coupled to the cathode of tube V12 through respective parasitic suppression resistors 172. The control grids of tubes V8 and V9 are coupled to terminal 173 by respective parasitic resistors 174. This terminal is coupled to the junction of resistors 43 and 44 (FIG. 8) and coupled to the cathode of tube V12 by resistor 175. The cathodes of tubes V8 and V9 are connected to a source of negative potential on terminal 176.

Tube V12 controls the screen grid potential of tubes V8 and V9. Its cathode is coupled to terminal 176 by resistor 177. Its plate and screen grid are direct coupled to ground, the screen grid through parasitic suppression resistor 189. The control grid of tube V12 is coupled to the junction 182 of biasing resistors 183 and 184 by parasitic suppression resistor 185. Junction 182 is by-passed to ground by capacitor 186.

Diodes D2 and D3 couple potentials to the control grid of cathode follower tube V12. The anode of diode D2 is connected to junction 182. The anode of diode D3 is connected to the junction of resistors 187 and 188 which form a biasing network. The cathodes of diodes D2 and D3 are connected together and coupled to the junction 191 of lower amplifier 161 and upper amplifier 162 by resistor 192 and bypassed to ground by capacitor 193. Resistor 194 couples the cathodes to a source of negative potential on terminal 195.

This circuit also includes a local inverse feedback path from the junction 191 of lower and upper amplifiers to the lower amplifier to insure that the upper tube receives a driving signal of sufficiently large magnitude to cut it off when the lower amplifier is being driven into conduction. The specific means by which this is accomplished in the circuit of FIG. 9 provides the desired performance obtained with the local feedback network shown in FIG. 8 which incorporating additional features which are especially advantageous in an amplifier delivering signals directly to a load at very high power levels. These features will become evident from the following discussion of the mode of operation.

When lower amplifier 161*a* is driven into conduction by the driving signal, the potential on junction 191 becomes negative and diode D2 conducts, completing a local feedback path from junction 191 through resistor 192, diode D2, resistor 185, cathode follower V12 and resistor 175 to both the screen and control grids of tubes V8 and V9. Thus, cathode follower V12 functions not only to supply energizing potentials to the screen grids of tubes V8 and V9, but also to couple the negatively fed back output signal to control and screen grids to increase the effect of the negatively fed back signal. This is especially important when using low $\mu$ tubes in a high power circuit because more drive is required to cut off the upper amplifier. An advantage of using the cathode follower to supply screen potentials is that less physical space is required for tube V12 than would be needed for power resistors of the size capable of handling the heavy screen currents drawn by tubes V8 and V9.

Bottoming diode D3 prevents the potential on the control grid of tube V12 from becoming less than the potential at the juiction of resistors 187 and 188. The utility of this diode will be better appreciated by considering the operating characteristics of the lower tubes in the circuit. When the potential on junction 191 is very low, the lower tubes must deliver considerable current. However, at the same time a large negative voltage would be fed back to the screens of the lower tubes if diode D2 were not present. The screen potential would then be so low that the lower tubes could not deliver the required current, thereby increasing the distortion. This difficulty is eliminated by choosing the potential at the junction of resistors 187 and 188 to be sufficiently high to permit the lower tubes to deliver the required current at all times and bottoming the cathode of diode D2 to this potential with diode D3.

It will be recalled that the local feedback path in the circuit of FIG. 8 was interrupted when the diode D1 was rendered conductive. By activating the feedback path when diode D2 conducts as described above, the cathode of the latter diode provides a convenient clamping point for insuring that the screen grid potential of tubes V8 and V9 does not dip below a value which insures proper operation.

Representative parameter values for the circuit of FIG. 8 are as follows:

| | | |
|---|---|---|
| Resistor 100 | megohm | 1 |
| Resistor 101 | ohms | 180,000 |
| Capacitor 102 | micromicrofarads | 360 |
| Resistor 103 | ohms | 100 |
| Potentiometer 104 | do | 10,000 |
| Resistor 105 | do | 500,000 |
| Capacitor 106 | microfarad | 0.1 |
| Resistor 107 | ohms | 250,000 |
| Resistor 111 | do | 100 |
| Resistor 112 | do | 30,000 |
| Resistor 113 | do | 100 |
| Inductor 114 | millihenry | 0.5 |
| Resistor 115 | ohms | 8,700 |
| Capacitor 116 | microfarad | .022 |
| Capacitor 117 | micromicrofarads | 220 |
| Capacitor 121 | microfarad | .002 |
| Resistor 122 | ohms | 1,200 |
| Resistor 123 | do | 1,400 |
| Potentiometer 124 | do | 2,000 |
| Inductor 125 | millihenry | 0.5 |
| Resistor 126 | ohms | 10,000 |
| Resistor 127 | do | 100 |
| Capacitor 131 | micromicrofarads | 220 |
| Resistor 132 | ohms | 47,000 |
| Capacitor 133 | microfarad | .0047 |
| Resistor 134 | ohms | 120,000 |
| Capacitor 135 | microfarad | .001 |
| Resistor 136 | ohms | 100 |
| Resistor 137 | megohms | 3 |
| Resistor 140 | ohms | 100 |
| Resistor 141 | do | 18 |
| Resistor 142 | do | 200,000 |
| Resistor 143 | megohms | 1.5 |
| Resistor 144 | ohms | 100 |
| Resistor 146 | do | 100 |
| Resistor 147 | do | 30,000 |
| Resistor 148 | do | 6,300 |
| Capacitor 151 | microfarad | 0.1 |
| Inductor 152 | millihenries | 8.2 |
| Resistor 153 | ohms | 330 |
| Capacitor 154 | microfarads | — |
| Potentiometer 155 | megohms | 1 |
| Resistor 156 | do | 5.7 |
| Resistor 157 | ohms | 220 |
| Capacitor 158 | micromicrofarads | 330 |
| Capacitor 162 | microfarads | 10 |
| Resistor 164 | ohms | 100,000 |
| Capacitor 18 | micromicrofarads | 39 |
| Resistor 21 | ohms | 2,700 |
| Inductor 17 | millihenries | 250 |
| Resistor 19 | ohms | 50,000 |
| Resistors 22 and 32 | do | 8,200 |
| Resistor 37 | do | 3,100 |
| Resistor 38 | do | 2,500 |
| Resistor 34 | do | 3,500 |
| Resistor 43 | megohms | 1.1 |
| Resistor 44 | ohms | 620,000 |
| Tubes V1 and V2 | | ½–6BK7–A |
| Tubes V3 and V4 | | 6CL6 |
| Tubes V5 and V6 | | 6DQ6–A |
| Terminal 20 potential | volts | −580 |
| Terminal 23 potential | do | +220 |
| Terminal 46 potential | do | −255 |
| Terminal 45 potential | do | +255 |

An amplifier including the above parameter values provides 10 watts of power into a 600 ohm load from D.-C. through one megacycle with a harmonic distortion of less than .01 percent for nearly the entire frequency range. At 200 watts output, the distortion is less than 0.1 percent through nearly the entire range. A high impedance full range loudspeaker driven by the novel power amplifier reproduces sound with a minimum of non-linear distortion.

Representative parameter values for the circuit of FIG. 9 are as follows:

| | | |
|---|---|---|
| Resistors 164 and 171 | ohms | 10 |
| Resistors 166, 168, 172, 174, 185 and 189 | ohms | 100 |
| Resistor 175 | do | 390,000 |
| Resistor 177 | do | 180,000 |
| Resistor 183 | do | 430,000 |
| Resistor 184 | megohm | 1 |
| Capacitor 186 | microfarad | .001 |
| Resistor 187 | ohms | 39,000 |
| Resistor 188 | do | 43,000 |
| Resistor 192 | do | 82,000 |
| Capacitor 193 | microfarad | 0.47 |
| Resistor 194 | ohms | 510,000 |
| Tubes V8, V9, V10 and V11 | | 6DQ5 |
| Diodes D2 and D3 | | 6AL5 |
| Terminal 163 potential | volts | +250 |
| Terminal 176 potential | do | −250 |
| Terminal 195 potential | do | −580 |

When the circuit of FIG. 8 is modified as shown in FIG. 9 and incorporates the parameters tabulated above, the available power output is increased to 50 watts over substantially the same range of frequencies.

It is apparent that those skilled in the art may now make numerous modifications of and departures from the specific circuits described herein without departing from the inventive concepts. Consequently, the invention is to be construed as limited only by the spirit and scope of the appended claims.

What is claimed is:

1. A power amplifier comprising, an input stage for receiving at its input signals to be amplified, a power output stage having an input coupled to the output of said input stage and having an output furnishing the signal output of said amplifier, a negative feedback path coupling said output of said power output stage to said input of said input stage, said input stage comprising, an electron tube having at least a plate, cathode and control grid, the shunt combination of an inductor, cathode capacitor and cathode resistor in series with said cathode, a load resistor in series with and coupling said plate to a potential source, means for applying said input signals to the grid of said electron tube, means for deriving output signals from the plate of said electron tube for application to said input of said power output stage, said input stage being loaded by output capacity and the input resistance of the following stage, means for providing said input stage with a substantially flat frequency response below a first frequency, a decreasing frequency response from said first frequency to a second higher frequency, a substantially flat frequency response from said second frequency to a cutoff frequency, and a decreasing frequency response above said cutoff frequency, said last mentioned means being provided by arranging said input stage whereby said cutoff frequency is the reciprocal of the product of said output capacity with the parallel resistance combination of said load resistor, said input resistance and the plate resistance of said electron tube, whereby the product of the amplification factor of said electron tube with the impedance of said inductor at said first frequency is approximately equal to the sum of said load resistance and said plate resistance, whereby said cathode resistance is substantially equal to the impedance of said inductor at said second frequency, and further whereby the product of said cathode capacitor with said cathode resistor is substantially equal to the product of said output capacity with the resistance of said parallel resistance combination.

2. A power amplifier in accordance with claim 1 wherein said negative feedback path includes a feedback network for imparting a phase lead to signals having frequencies above said cutoff frequency, said feedback network providing a substantially constant attenuation less than unity below said cutoff frequency and providing a proportionately decreasing attenuation for frequencies above said cutoff frequency.

3. A power amplifier in accordance with claim 1 wherein said negative feedback path includes a feedback network for imparting a phase lead to signals having frequencies within the range above said cutoff frequency, said feedback network including a first resistor shunted by a second resistor in series with a capacitor, the impedance of said capacitor being much larger than the impedance of said first resistor to signals having frequencies below said cutoff frequency, the impedance of said second resistor in series with said capacitor being smaller than the impedance of said first resistor to signals having frequencies above said cutoff frequency.

4. In a feedback amplifier, an amplification stage comprising, an electron tube having at least a plate, cathode and control grid, the shunt combination of an inductor, cathode capacitor and cathode resistor, said shunt combination being in series with said cathode, a load resistor in series with and coupling said plate to a potential source, means for applying input signals to the grid of said electron tube, means for deriving output signals from the plate of said electron tube, said stage being loaded by output capacity and the input resistance of the following stage, means for providing said amplification stage with a substantially flat frequency response below a first frequency, a decreasing frequency response from said first frequency to a second higher frequency, a substantially flat frequency response from said second frequency to a cutoff frequency, and a decreasing frequency response above said cutoff frequency, said last mentioned means being provided by arranging said amplification stage whereby said cutoff frequency is the reciprocal of the product of said output capacity with the parallel resistance combination of said load resistor, said input resistance and the plate resistance of said electron tube, whereby the product of the amplification factor of said electron tube with the impedance of said inductor at said first frequency is approximately equal to the sum of said load resistance and said plate resistance, whereby said cathode resistance is substantially equal to the impedance of said inductor at said second frequency, and further whereby the product of said cathode capacitor with said cathode resistor is substantially equal to the product of said output capacity with the resistance of said parallel resistance combination.

5. A power amplifier comprising, first, second, third and fourth electron tubes each having at least a cathode, plate and control grid, first and second substantially equal load resistors in series with and coupling said first and second electron tube plates respectively to a power source, a cathode resistor in series with and common to said first and second electron tube cathodes, said cathode resistor being substantially half the value of said load resistors, a biasing resistance in series with and coupling said cathode resistor to a reference potential, means for direct coupling said third electron tube plate to said fourth electron tube cathode, means coupling said fourth electron tube plate to a power source, first and second attenuator resistances connected in series between one of said first and second electron tube plates and the junction of said cathode resistor and said biasing resistance, means for direct coupling the junction of said first and second attenuator resistances to said third electron tube control grid, means for direct coupling the other of said first and second electron tube plates to said fourth electron tube control grid and means for applying input signals to said first and second electron tube grids.

6. Apparatus in accordance with claim 5 and further comprising means for applying oppositely-phased signals respectively to said first and second electron tube control grids, and means for deriving an output signal from said third electron tube plate.

7. A power amplifier comprising first, second, third and fourth electron tubes each having at least a cathode, plate and control grid, first and second load resistors in series with said first and second electron tube plates respectively, means for direct coupling said first and second electron tube plates to said third and fourth electron tube grids respectively, an output terminal, means for direct coupling said third electron tube plate and said fourth electron tube cathode to said output terminal, a resistive circuit common to said cathodes of said first and second electron tubes, a source of direct potential delivering power to said first and second electron tubes through said first and second load resistors respectively and through said common cathode circuit, resistive means coupled between said direct potential source and said second load resistance, means for direct coupling the junction of said third electron tube plate and said fourth electron tube cathode to the junction of said resistive means and said second load resistance, and means for direct coupling said grid of said third electron tube to said common cathode circuit of said first and second electron tubes for establishing the quiescent current conditions of said third and fourth electron tubes.

8. A power amplifier in accordance with claim 7 wherein said common cathode circuit includes at least two serially connected resistors, said direct coupling of said third electron tube grid to said common cathode circuit being a third resistor connected at one end to said third electron tube grid and at the other end to the junction of said two serially connected resistors.

9. A power amplifier comprising first and second series-connected electron tube amplifiers each having at least a plate connection, cathode connection and control grid connection, said first amplifier plate connection being connected at a junction to said second amplifier cathode connection, an output terminal coupled to said junction, a feedback impedance circuit including a unilaterally conducting device for coupling said junction and said control grid connection of one of said amplifiers, a source of first and second oppositely phased driving signals, means for coupling said first and second driving signals to said first amplifier grid connection and said second amplifier grid connection respectively to provide an output signal on said junction, said unilaterally conducting device being responsive to the polarity of the signal on said junction for selectively directing a portion of said output signal through said feedback impedance to said one amplifier causing said one amplifier to then be effectively driven by a driving signal of lesser amplitude than is said other amplifier.

10. Apparatus in accordance with claim 9 and further comprising means for inversely feeding back a portion of said output signal to said source of driving signals.

11. A power amplifier comprising upper and lower electron tube amplifiers each having at least a plate connection, cathode connection and control grid connection, said lower amplifier plate connection being connected at a junction to said upper amplifier cathode connection, an output terminal coupled to said junction, a cathode follower having at least a plate, control grid and cathode, a unilaterally conducting device in series with said junction and said cathode follower control grid, means for coupling said cathode follower cathode to said lower amplifier control grid connection, a source of first and second oppositely phased driving signals, means for coupling said first and second driving signals to said lower amplifier grid connection and said upper amplifier grid connection respectively to provide an output signal on said junction, said unilaterally conducting device being responsive to the polarity of the signal on said junction for selectively directing a portion of said output signal through said cathode follower to said lower amplifier causing said lower amplifier to then be effectively driven by a driving signal of lesser amplitude than is said other amplifier.

12. Apparatus in accordance with claim 11 and further comprising a screen grid connection for at least said lower amplifier, and means for coupling said cathode follower cathode to said lower amplifier screen grid connection.

13. Apparatus in accordance with claim 12 and further comprising a source of a fixed potential equal to the minimum potential said screen grid connection should assume to continuously provide low distortion operation of said power amplifier, and a second unilaterally conducting device between said cathode follower control grid and said fixed potential source arranged to prevent the potential on said cathode follower control grid from falling below said fixed potential.

14. In a feedback amplifier, an amplifying stage comprising first and second electron tubes each having at least a cathode, plate and control grid, the shunt combination of an inductor having negligible resistance, cathode capacitor and cathode resistor, said shunt combination being direct coupled between said first and second electron tube cathodes, a source of D.-C. potential, means for applying D.-C. potential from said source directly to one of said cathodes and solely through said shunt combination from said one cathode to said other, and respective load resistances coupling said D.-C. potential source with respective ones of said electron tube plates.

15. Apparatus in accordance with claim 14 wherein said means for applying said D.-C. potential directly to said one of said cathodes includes an unbypassed resistor connected between said source of D.-C. potential and said one of said cathodes, said unbypassed resistor having a resistance large compared to that of said cathode resistance.

16. Apparatus in accordance with claim 14 and including means for providing said amplifying stage with a substantially flat frequency response below a first frequency, a decreasing frequency response from said first frequency to a second higher frequency, a substantially flat frequency response from said second frequency to a cutoff frequency, and a decreasing frequency response above said cutoff frequency, said last mentioned means being provided by arranging said amplifying stage whereby said cutoff frequency is the reciprocal of the product of the output capacity loading one of said electron tubes with the combined resistance of one of said load resistances in parallel with the plate resistance of said one tube and the input resistance of the following stage, and whereby the product of the amplification factor of one of said electron tubes with half the impedance of said inductor at said first frequency is approximately equal to the sum of one of said load resistances and one of said plate resistances, whereby said cathode resistance is equal to the impedance of said inductor at said second frequency, and further whereby the product of said cathode capacitor with said cathode resistor is substantially equal to the product of said output capacity with said combined resistance.

17. A power amplifier comprising first, second, third and fourth electron tubes each having at least a cathode, plate and control grid, first and second load resistors in series with said first and second electron tube plates respectively, means for direct coupling said first and second electron tube plates to said third and fourth electron tube grids respectively, an output terminal, means for direct coupling said third electron tube plate and said fourth electron tube cathode to said output terminal, a source of direct potential delivering power to said first and second electron tubes through said first and second load resistors respectively, resistive means including a fifth electron tube having at least a cathode, plate and control grid coupled between said direct potential source and said second load resistance, said direct potential source delivering power to said fifth electron tube plate, said fifth electron tube cathode being connected to said second load resistance, said fifth electron tube control grid being direct coupled to the junction of said third electron tube plate and said fourth electron tube cathode.

References Cited in the file of this patent

UNITED STATES PATENTS

| | | |
|---|---|---|
| 2,247,155 | Goodenough | June 24, 1941 |
| 2,289,821 | Boucke | July 14, 1942 |
| 2,529,459 | Pourciau et al. | Nov. 7, 1950 |
| 2,719,225 | Morris | Sept. 27, 1955 |
| 2,761,019 | Hall | Aug. 28, 1956 |
| 2,763,733 | Coulter | Sept. 18, 1956 |
| 2,773,136 | Futterman | Dec. 4, 1956 |
| 2,802,907 | Peterson | Aug. 8, 1957 |
| 2,810,025 | Clements | Oct. 15, 1957 |

FOREIGN PATENTS

| | | |
|---|---|---|
| 529,044 | Great Britain | Nov. 13, 1940 |
| 702,496 | Germany | Feb. 10, 1941 |
| 553,847 | Great Britain | June 8, 1943 |
| 433,186 | Italy | Apr. 3, 1948 |
| 932,134 | Germany | Aug. 15, 1955 |